United States Patent [19]

Raudat et al.

[11] Patent Number: 4,637,509
[45] Date of Patent: * Jan. 20, 1987

[54] ARTICLE GROUPER FOR CASE PACKER

[75] Inventors: John L. Raudat, North Madison; Timothy H. Thompson, Durham, both of Conn.

[73] Assignee: Standard-Knapp, Inc., Portland, Conn.

[ * ] Notice: The portion of the term of this patent subsequent to Nov. 12, 2002 has been disclaimed.

[21] Appl. No.: 750,340

[22] Filed: Jun. 28, 1985

Related U.S. Application Data

[63] Continuation-in-part of Ser. No. 565,754, Dec. 27, 1983, Pat. No. 4,552,261.

[51] Int. Cl.$^4$ .............................................. B65G 47/26
[52] U.S. Cl. ..................................... 198/425; 198/461
[58] Field of Search ............... 198/425, 451, 456, 459, 198/461, 606, 798, 800; 53/247, 248

[56] References Cited

U.S. PATENT DOCUMENTS

| | | | |
|---|---|---|---|
| 3,194,381 | 7/1965 | Sherman | 198/425 |
| 4,457,121 | 7/1984 | Johnson et al. | 53/247 X |
| 4,552,261 | 11/1985 | Raudat et al. | 198/425 |

Primary Examiner—Joseph E. Valenza
Assistant Examiner—Lyle Kim
Attorney, Agent, or Firm—McCormick, Paulding & Huber

[57] ABSTRACT

Two chain conveyor systems have two sets of grouper pins mounted on flight bars at a predetermined pitch so that the pins move upwardly between articles fed through a common upper run of the chain conveyors. One chain conveyor system is driven at a speed that varies sinusoidally and is synchronized with the speed of the articles. The other chain conveyor system is driven through a differential device so that its pins move at a speed which varies oppositely to the one chain conveyor system. Also disclosed is an improved chain conveyor and outfeed lug conveyor system for such a grouper.

4 Claims, 11 Drawing Figures

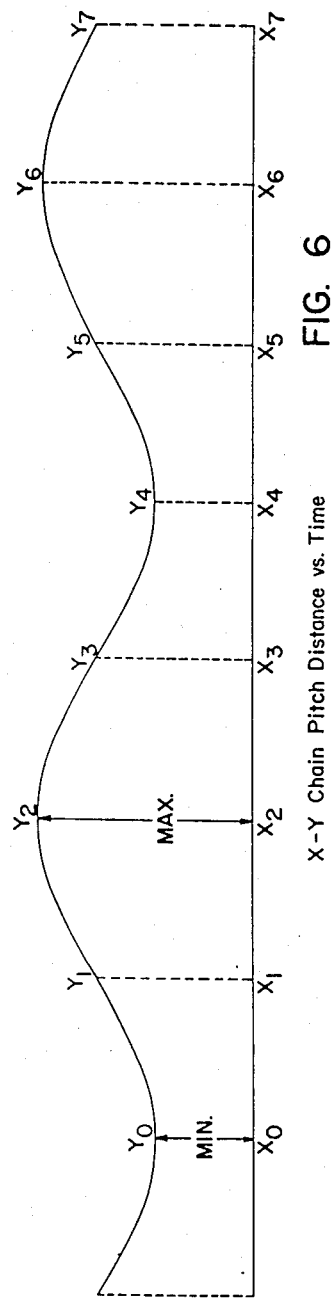
FIG. 6 X-Y Chain Pitch Distance vs. Time
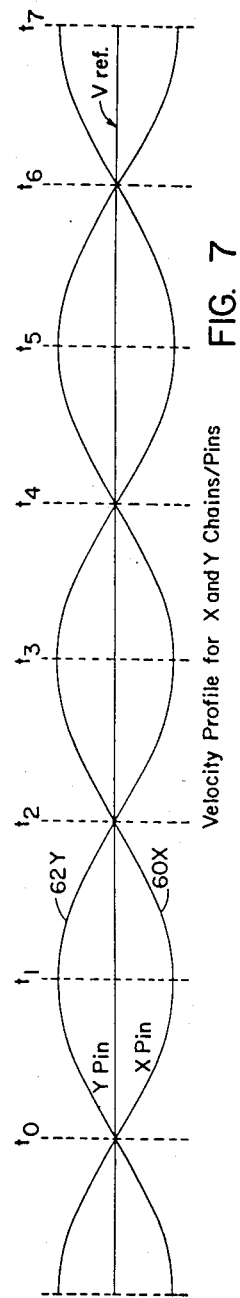
FIG. 7 Velocity Profile for X and Y Chains/Pins

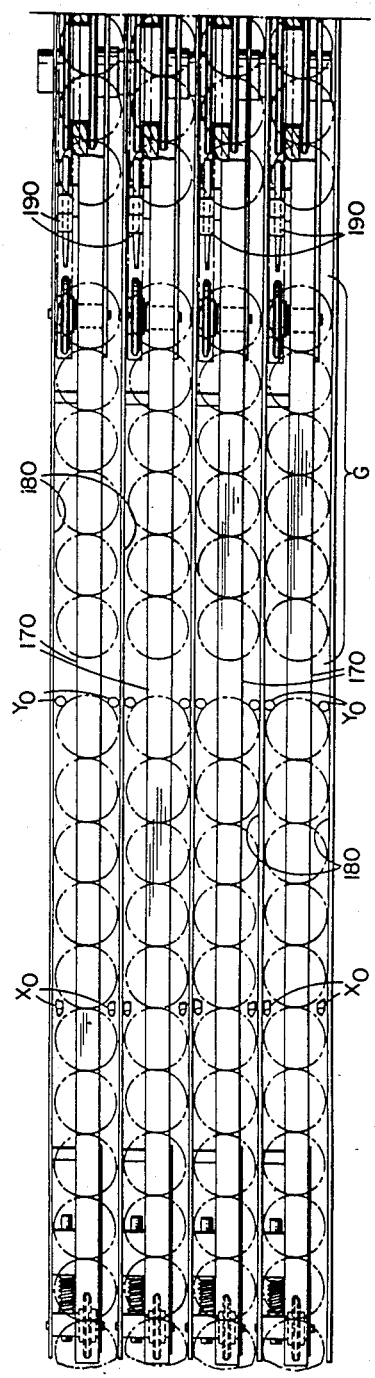

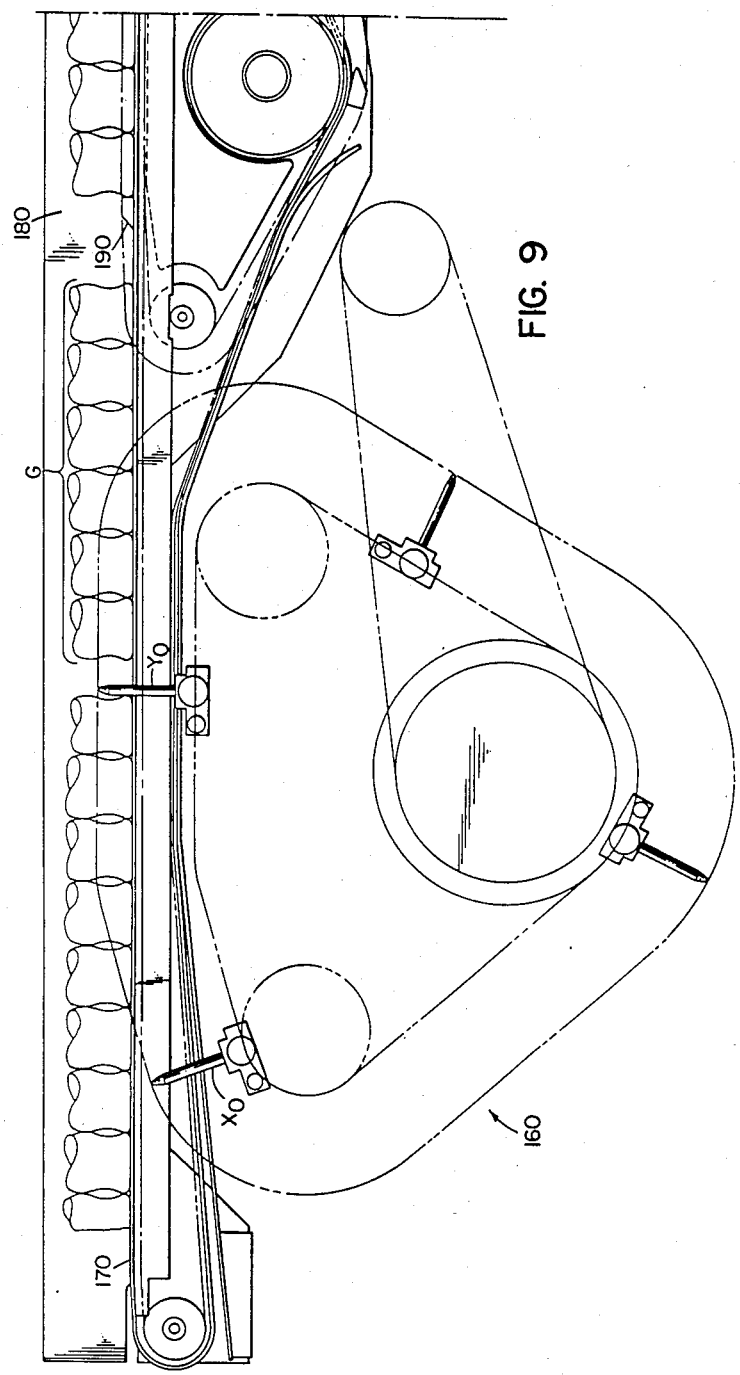

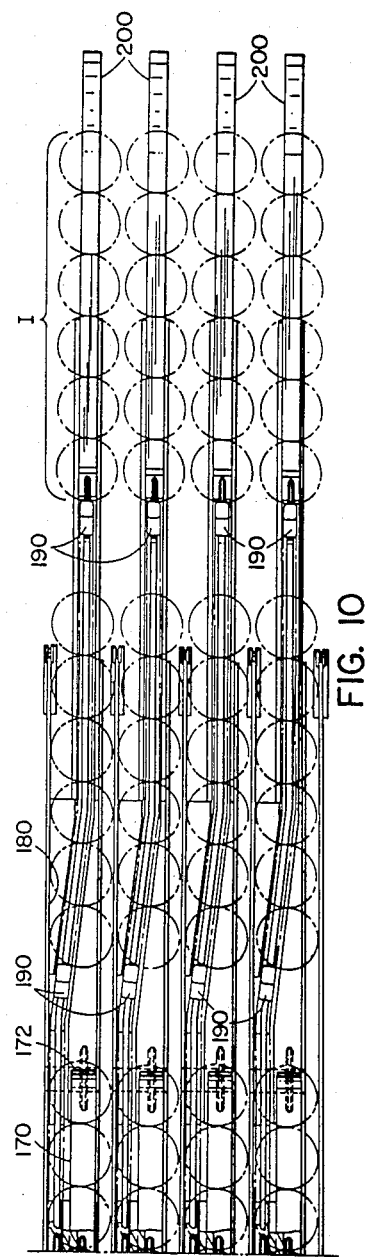
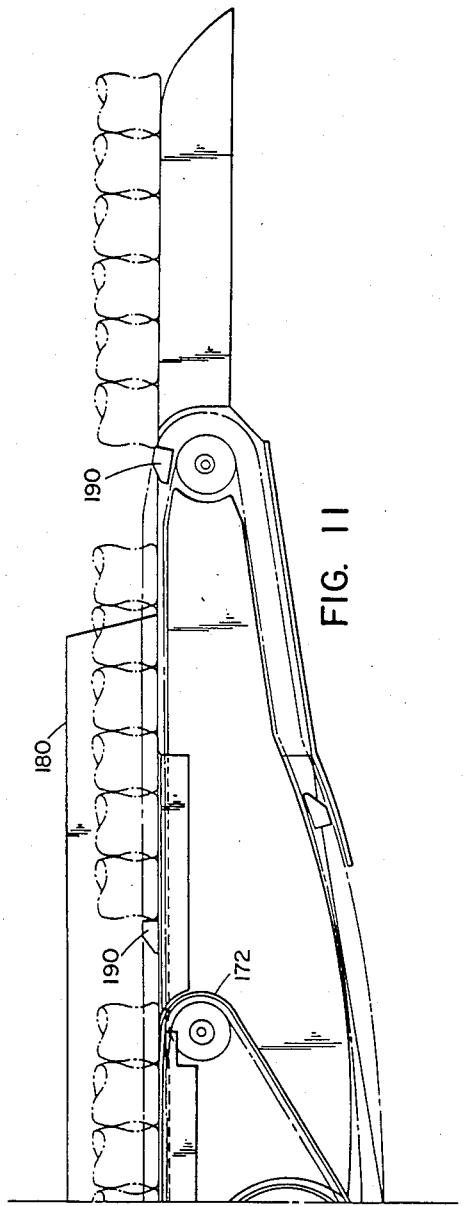
FIG. 10
FIG. 11

ARTICLE GROUPER FOR CASE PACKER

CROSS REFERENCE TO RELATED APPLICATIONS

This application is a continuation-in-part of an earlier application filed by the same inventors and bearing the same title, Ser. No. 565,754 filed Dec. 27, 1983, now U.S. Pat. No. 4,552,261, and assigned to the assignee herein. Another related application identified below as "Continuous Motion Bottle Packer" has since issued under U.S. Pat. No. 4,457,121. The disclosure in said patent is incorporated by reference herein.

BACKGROUND OF THE INVENTION

This invention relates generally to systems for forming discrete groups of articles so that these article groups can be dropped into upwardly open packing cases, and deals more particularly with a grouper of the pin type having upstanding pins for entry between adjacent articles in a line of articles. Predetermined numbers of articles are first decelerated and then accelerated to form a space therebetween in order to provide for positive handling of groups of the articles by a pocket chain conveyor or constant velocity conveyor equipped with upstanding lugs spaced apart at predetermined distances to accommodate the article groups therebetween.

The conveyor system for forming discrete groups of article to be described herein is especially adapted for use with a continuous motion bottle packer of the type shown in a pending application entitled "Continuous Motion Bottle Packer", Ser. No. 425,104 filed Sept. 27, 1982 and assigned to the assignee herein. This pending application shows a plurality of grids provided in a rotary structure which is adapted to move each grid in turn through an infeed station where the groups of article are fed into the grid without interrupting their forward speed. Each grid is in turn moved through a discharge station where the groups of articles are dropped into upwardly open packing cases. Both the infeed and discharge station operate without interrupting the motion of the articles or the movement of the packing case itself. The disclosure in said pending application is incorporated by reference herein. A brief description of the overall packer follows.

The continuous motion bottle packer as disclosed in the pending application includes article conveyor means for advancing the bottles continuously in side-by-side columns along a first horizontal path. These articles are arranged in end-to-end relationship between lane dividers, and means is provided for forming groups of these articles corresponding to the capacity of the cases to be packed. The means for grouping the articles, are provided in the packer, comprises a pin conveyor operated at a slightly slower speed than an underlying article lane conveyor to allow predetermined numbers of articles to advance in orderly groups toward the infeed station of the packer. Indexing means is provided at the downstream end of the lane conveyor to assure that the article groups move in timed relationship into the orbiting grid structures which carry the groups of articles around a circular path to a discharge station where they are deposited into upwardly open packing cases, all without interruption of the speed of movement both of the articles and of the packing cases.

The infeed station at the downstream end of these lane conveyors includes fixed cantilever mounted fingers for slidably receiving columns or lanes of articles, and these fingers are spaced to define horizontally extending openings therebetween. The grid structures are designed to pass upwardly through these finger openings as a result of the unique construction of each grid. Each grid consists of longitudinally extending support rails which carry corner posts defining pockets for the individual articles. Front and rear cross members of each grid structure are provided for supporting the ends of these rails, and the corner post have upper portions which fit between adjacent articles in the advancing article group as each grid moves upwardly through the infeed station.

The grid structures move in a circular orbit oriented in a vertical plane and the tangential direction of movement for the grid structures entering the infeed station forms an acute angle with the horizontal path of the articles themselves arriving at the infeed station. The horizontal component of velocity for the grid structures at the infeed station is such that it matches the horizontal speed of the articles moving into the infeed station under the control of the indexing means. This provides for a slight acceleration of the grid and the articles entrained therein as the grid moves away from the infeed station. The tangential speed of the grid exceeds the speed of the articles moving into the infeed station.

Thus, the articles move at a controlled speed through the infeed station into each grid structure where they are transported around approximately 180 degrees of circular travel to a discharge station. Each grid structure includes pivoted vanes for engaging and supporting the underside of the articles and these vanes receive each article in the group so as to carry the article away from the infeed station without interrupting their forward motion. A smooth transition for the motion of the articles is achieved from a straight infeed line to the circular orbit and the article groups are themselves pivotally carried in the rotating grid support structure so they remain in horizontal orientation as they travel to the discharge station.

The discharge station is defined at the low point of the orbit, and a case conveyor moves upwardly open cases continuously through the discharge station, being driven at a speed which varies cyclically to correspond to the horizontal component of motion for each orbiting grid structure as it moves through the discharge station. Slightly ahead of the low point in the orbit, the pivoted vanes supporting the articles are retracted beneath the grid rails and the articles are allowed to free fall into the upwardly open packing case moving immediately below the grid structure. A funnel structure is provided in each grid structure for guiding the articles into the packing case or more particularly into individual pockets defined by the packing case and also serves to decelerate the articles as they are dropped in guided fashion, again without interrupting the motion for the articles and of the continuously moving packing case.

The chief aim of the present invention is to provide an article grouper for a continuous motion bottle packer of the type described above so as to achieve a smooth grouping of the bottles prior to moving them in controlled fashion to the infeed station. The groups are accelerated away from the grouper by flat chain conveyors associated with each of several article lanes, and by conveyors moving the groups off these chain conveyors into the infeed station.

SUMMARY OF THE INVENTION

Infeed conveyor means serves to move columns of articles in end-to-end relationship in a downstream direction so that a grouper conveyor system can form discrete groups of articles from these columns of advancing articles. The grouper conveyor system includes at least two sets of conveyor chains each of which has flight bars with projecting pins carried by the chains. One of the chains sets is driven in timed relationship with a pocket chain conveyor or lug conveyor driven in synchronism with it so as to advance the grouped articles through the infeed station as described above. Each conveyor chain set is driven at a variable speed so that its projecting pins follow a cycle as the chain moves the pins around a closed orbit that includes an upper run so oriented that the pins move in the same path and in the same direction as the advancing articles. Differential means couples one chain set to the other so that the other chain set and its pins move in the same orbit but at a speed which varies inversely to that of the one chain set and its associated pins. The pins on the flight bars associated with each chain set are provided in staggered relationship to one another to establish the pitch distance between their associated pins as they move along this upper run through the grouper. Means is provided for adjusting the pitch of these pins relative to one another to accommodate predetermined numbers and/or sizes of articles therebetween.

The groups are accelerated away from the grouper by individual flat conveyor chains that are somewhat narrower than the widths of the articles, and of the lanes in which they move. These flat conveyors allow shippage between them and the articles during deceleration, due to grouper action, but they do accelerate the article groups leaving the grouper. In a preferred embodiment individual pushers, on individual conveyors move upwardly to engage the last articles in each lane and positively accelerate and advance the group into the infeed station.

BRIEF DESCRIPTION OF THE DRAWINGS

FIG. 6 is a graph illustrating the variation in chain pitch distance during a single orbit of the chain conveyor pins.

FIG. 7 is a graph illustrating the variation of one conveyor chain speed relative to the other, and to the constant speed of the infeed conveyor ($V_{ref}$) in a complete orbit.

FIG. 8 is a plan view of an upstream portion of an alternative embodiment showing the same grouper as illustrated in FIGS. 1-7, but illustrating single pusher conveyors to control the article groups for movement off the flat chain conveyors and into the infeed station.

FIG. 9 is an elevational view of the structure illustrated in FIG. 8.

FIG. 10 is a plan view of a downstream portion of the embodiment shown in FIG. 8.

FIG. 11 is an elevational view of the structure shown in FIG. 10.

DETAILED DESCRIPTION OF FIGS. 1-7

Figure 1:
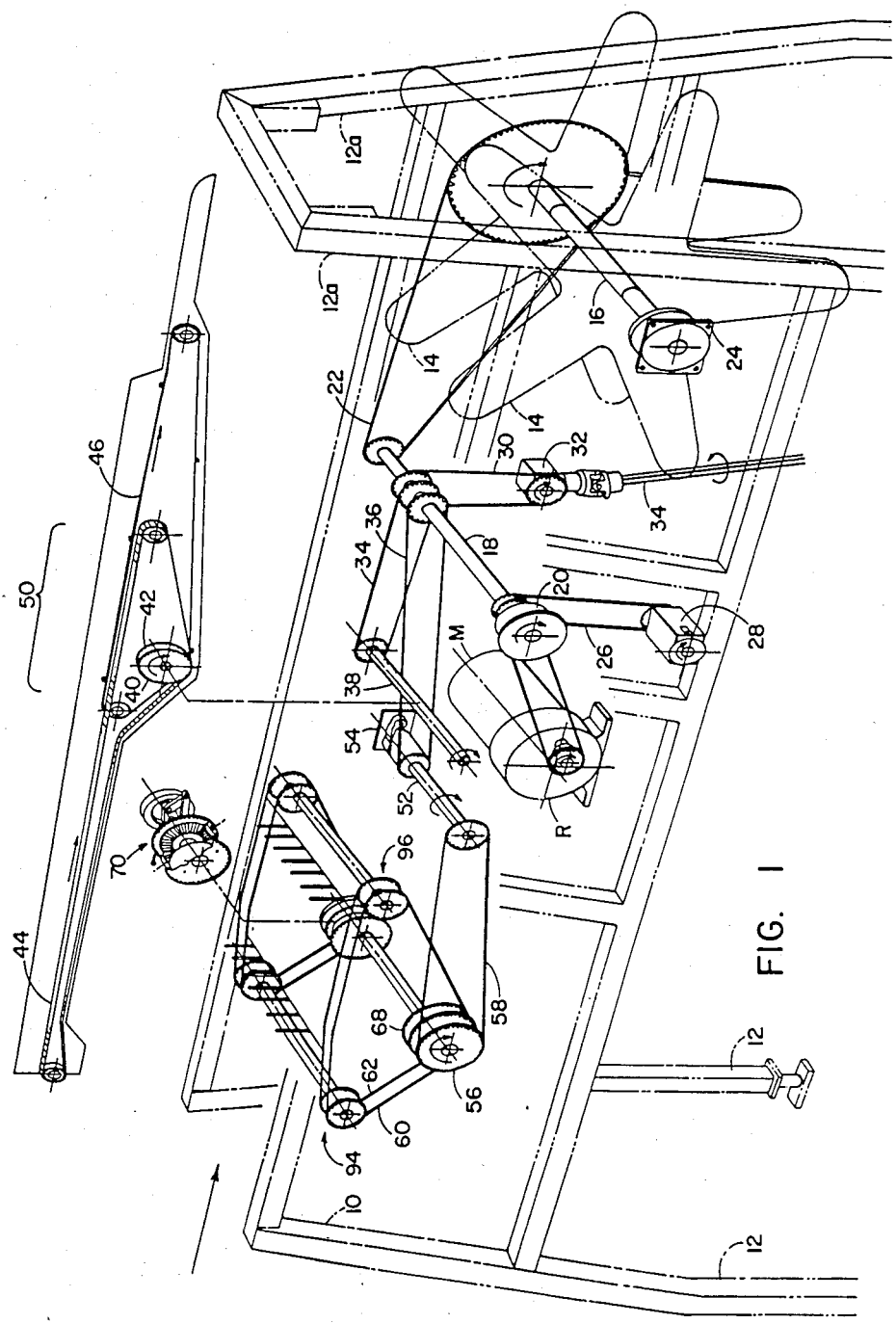
FIG. 1 is a perspective view of the relevant portion of a continuous motion bottle packer of the type shown in the above mentioned patent application, and illustrates the various components thereof which cooperate with the grouper conveyor system described herein.

Turning now to the drawings in greater detail, and referring particularly to FIG. 1, a continuous motion packer is there illustrated in schematic fashion with portions illustrated in exploded relation to better illustrate the elements of the packer which cooperate with the improved grouper conveyor system of the present invention. A fixed framework 10 is supported on vertical posts 12 and 12a two of which posts 12a, 12a rotatably support the ferris wheel structure in which the grid structures (not shown) are themselves pivotably supported at circumaxially spaced locations in the ferris wheel as defined by the radially outwardly projecting arms 14, 14. As described in the above mentioned pending application the grid structures move in a circular orbit at a constant angular velocity in their respective support hubs (not shown). The grid structures are interconnected by chains or belts (not shown) which serve to maintain each individual grid structure in a horizontal relationship as it moves around the vertically oriented orbit of motion defined by the horizontal ferris wheel axis of shaft 16.

A drive motor M has a gear reduction unit R at one end and operates drive shaft 18 through an overload clutch 20. The shaft 18 drives a chain 22 for rotating the ferris wheel structure as described above. A brake may be provided on the end of ferris wheel shaft 16, as suggested at 24, to facilitate stopping of the ferris wheel in the event of a malfunction or pursuant to a normal stop sequence. The driven shaft 18 may also include a driven timing belt 26 for operating a timing cam box 28 for controlling both a start and a stop sequence for the packer.

Driven shaft 18 also has a chain 30 connected to a right angle gear drive box 32 to rotate a drive shaft 34 associated with the case conveyor system (not shown). Shaft 18 also rotates chains 34 and 36 associated with the grouper conveyor system to be described and with infeed and outfeed conveyors associated with the grouper. Chain 34 drives shaft 38 which in turn rotates drive sprockets 40 and 42 associated with the infeed conveyor 44 and the lug conveyor 46 respectively. Both the infeed conveyor 44 and the outfeed or lug conveyor 46 have segments passing through a common area or length 50 where the articles are to be appropriately grouped so as to be efficiently handled between the lugs on outfeed conveyor 46 and then transported in discrete groups to the infeed station for pickup by the grid structures referred to previously.

Figure 2:
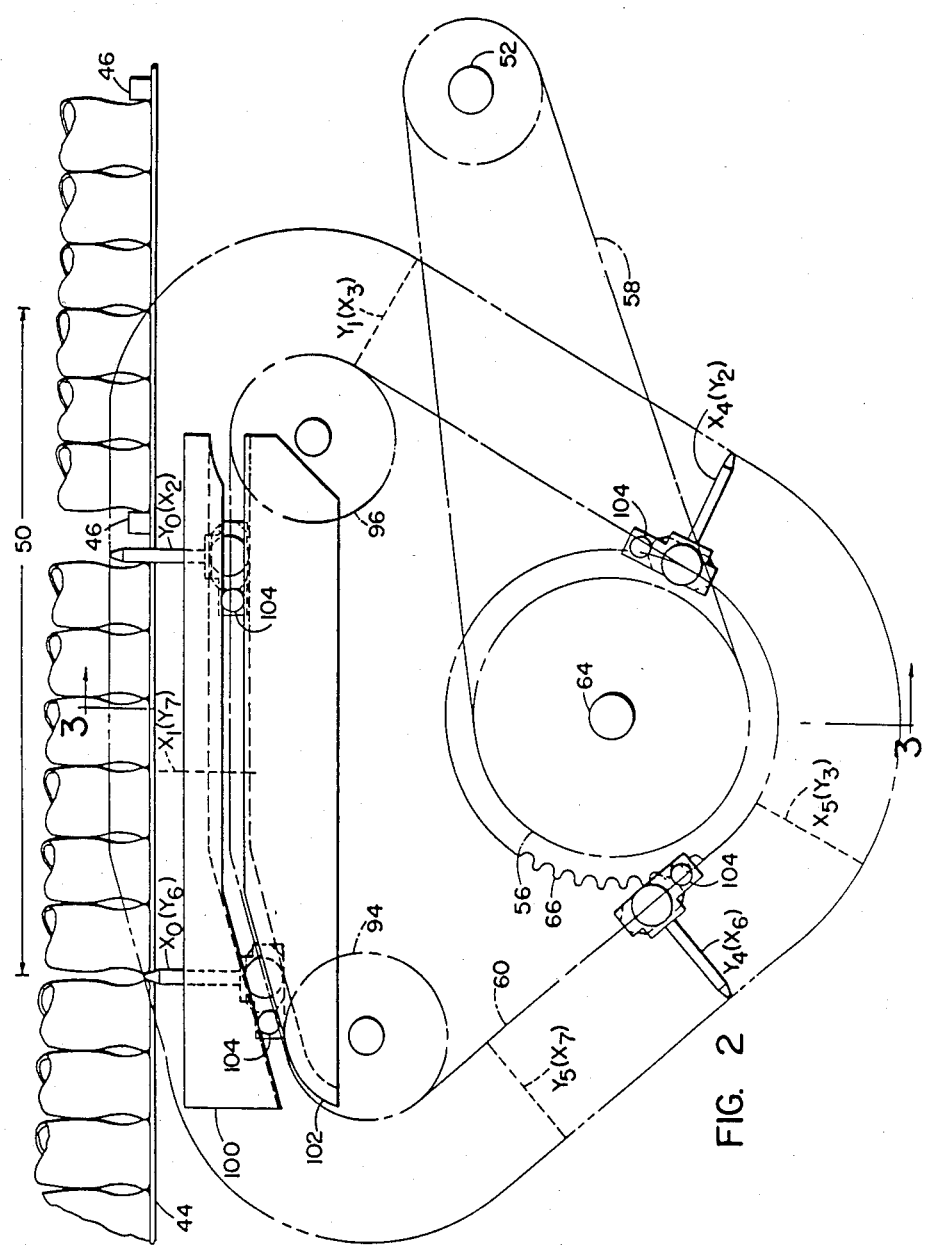
FIG. 2 is an elevational view showing in schematic fashion the path taken by the two pin conveyor sets during one orbit.

Turning now to the grouper conveyor system, and still with reference to FIG. 1, grouper input shaft 52 is driven from driven chain 36 referred to previously through a clutch brake mechanism 54. The mechanism 54 is adapted to start and stop shaft 52 in synchronism with other packer components. Shaft 52 in turn drives sprocket 56 through drive chain 58. Drive chain 58 and sprocket 56 are shown in FIG. 2, which figure also shows that a coaxially arranged sprocket 66 meshes with chain conveyor 60 so that a portion of chain 60 moves parallel to and through the area 50 referred to previously. The articles are formed into groups through this area 50 as a result of pin $X_0$ mounted on chain 60 moving upwardly between adjacent articles at the position shown for purposes of separating these articles as a result of chain 60 and pin $X_0$ being decelerated relative to the speed of the articles on the infeed conveyor chain 44.

Actually two such pin conveyor chains 60 and 62 are provided with pins $X_0$ and $Y_0$ respectively. That is, the X pins are mounted on chain 60 and the Y pins on a chain 62 traveling in the same orbit but at a speed which varies relative to the speed of chain 60 as a result of structure to be described hereinafter.

Figure 3:
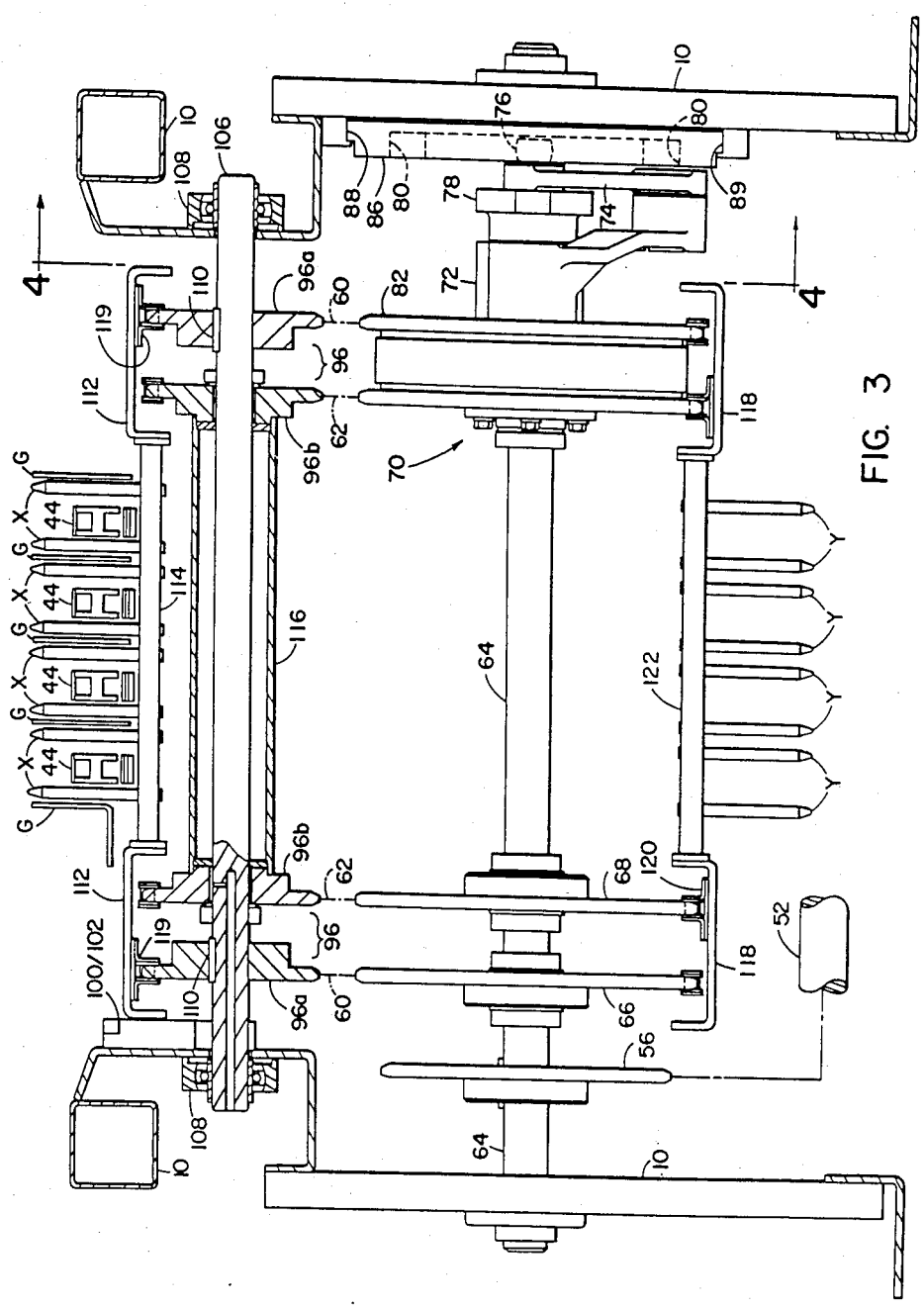
FIG. 3 is a vertical sectional view taken generally on the line 3—3 of FIG. 2.

The sprocket 56 and input drive shaft 58 for the pin conveyor chains cause rotation of a shaft 64 journalled at its ends in machine frame 10 as suggested in FIG. 3. This shaft 64 rotates at a speed which defines the reference velocity $V_{ref}$ for the X and Y chain 60 and 62 respectively, and as suggested schematically in FIG. 7. This shaft 64 freely supports the sprockets 66 and 68, which sprockets in turn support the X and Y chains 60 and 62 respectively, and this shaft 64 also passes through a differential means 70 to be described in greater detail hereinbelow to rotate a crank arm 72, best shown in FIG. 4, which crank arm in turn pivotably supports a cam follower lever 74 having a roller 76 at its free end. Said roller 76 is guided for generally radial movement relative to the axis of shaft 64 by an arcuate slot defined by a U-shaped yoke 78 provided on the end of shaft 64 so that cam follower roller 76 is restrained to move in a circular box cam groove 80 arranged in eccentric relationship to the axis of input shaft 64. As so constructed and arranged rotation of the shaft 64 causes corresponding rotation of the yoke 78 with the result that roller 76 moves around the eccentrically arranged cam track 80 to cause a sinusoidal variation in the angular velocity of crank arm 72. Crank arm 72 is in turn directly connected to the input sprocket or side 82 of differential 70 such that sprocket 82 drives X chain 60 at a speed which varies cyclically in the manner suggested by the line $60_X$ in FIG. 7. The other side of differential 70 comprises a sprocket 84 which in turn drives Y chain 62 at a speed which varies oppositely to the chain 60 as suggested by the lines $62_Y$ in FIG. 7.

The box cam track 80 is defined in a generally rectangular plate 86 which is slidably received in tracks 88, 89 defined by the machine frame 10. This movable plate 86 permits varying the degree of eccentricity for the cam track 80 relative to the axis of shaft 64 and of crank arm 72. The degree of eccentricity can be varied by rotating adjustment shaft 90 and it will be apparent that aligning the axis of box cam track 80 with the axis of crank arm 72 will result in the chains 60 and 62 being driven at the same speed $V_{ref}$.

It is an important feature of the present invention that the pins (X and Y) provided on the chains (60 and 62 respectively) are spaced relative to one another in these chains and FIG. 6 illustrates the change in pitch distance versus time for a single orbit for the pins as they travel around the tail sprocket and head sprocket assemblies 94 and 96 respectively and around the sprockets 66 and 68. The pitch distance provided between the X and Y pins at the instant $t_0$ is illustrated in FIG. 2. That this pitch is a minimum at $t_0$ is as also shown by the positions for the pins $X_0$ and $Y_0$ in FIG. 2. Two sets of pins ($X_0$ and $X_4$) and ($Y_0$ and $Y_4$) are provided on each chain 60 and 62 respectively giving rise to the double cycle illustrated in FIGS. 6 and 7 for pin movement as these pins $X_0$, $X_4$ and $Y_0$, $Y_4$ travel around the closed path defined for them by the sprocket structures 66/68 and 94/96. In these views (FIGS. 6 and 7) equal time increments are delineated by the vertical reference lines $t_0$-$t_7$ in FIG. 7. The change in pin pitch between the X and Y pins corresponds to these same incremental time changes. That is, both FIGS. 6 and 7 have time as the horizontal coordinate in the graphical presentations.

FIG. 6 suggests that these pins go through two cycles during each orbit as defined by the sprockets 66/68 and 94/96 in FIG. 2. More particularly, pin $X_0$ follows one cycle in traveling clockwise to the position shown at $X_4$ in FIGS. 2 and 6. At the same time the pin $Y_0$ follows one such cycle in traveling from its initial position to the position illustrated at $Y_4$ in FIG. 2. One additional cycle for each of these X and Y pins will return them to the position shown in FIG. 2. More particularly it will be apparent that during one-half such cycle pin $X_0$ travels from its FIG. 2 position to the position illustrated for the $Y_0$ pin, and during the next half cycle such pin $X_0$ travels from the $Y_0$ position to the position illustrated by the $X_4$ pin in FIG. 2. It can be seen from FIG. 7 that if one compares the velocity of the X and Y pins at times and at $t_2$ that the velocities are identical. Only two of these identical velocity situations occurs at the upper runs of the X and Y pin conveyor chains, that is only once during this double cycle will these pins actively engage articles or bottles for grouping them.

As mentioned previously the two X pins ($X_0$ and $X_4$) are provided on the chain 60 and the two Y pins ($Y_0$ and $Y_4$) are provided on the parallel chain 62. The relative pin positions for the X and Y pins in the orbit described previously with reference to FIG. 2, and FIG. 6 shows the instantaneous pin pitch for one of the two sets of X and Y pins. Vertical lines $X_0$—$Y_0$, $X_1$—$Y_1$, $X_2$—$Y_2$ to $X_7$—$Y_7$ correspond to the time lines $t_0$, $t_1$, $t_2$-$t_7$ in FIG. 7.

Figure 4:
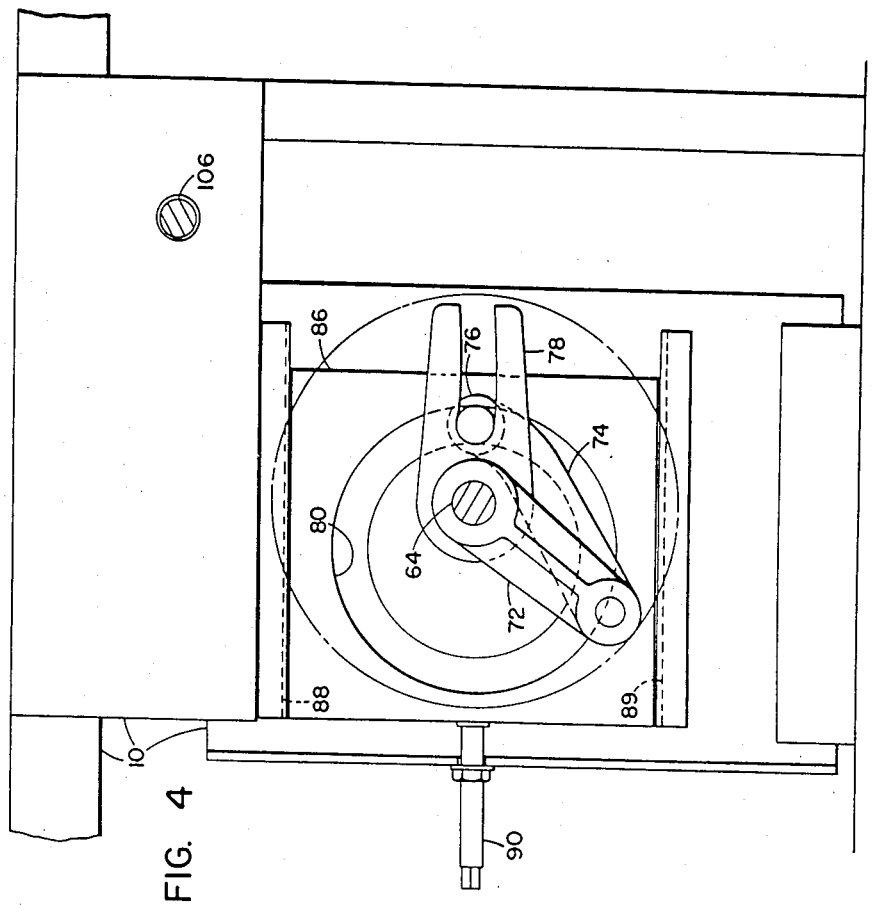
FIG. 4 is a vertical sectional view taken generally on the line 4—4 of FIG. 3.
Figure 5:
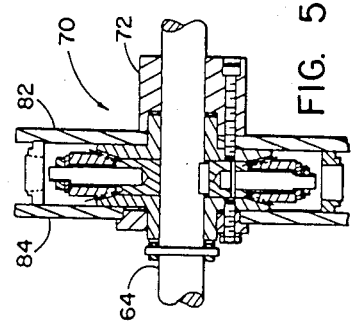
FIG. 5 is a sectional view through the differential means for coupling one chain conveyor set to the other chain conveyor set of FIG. 3.

FIG. 7 shows the velocity variations for the X and Y pins during the double cycle defined by the orbit of the chains. It should be noted that FIG. 4 shows crank arm 72 oriented at 45 degrees to the offset orientation for the cam plate and associated track 80. This is to achieve a maximum speed variation during the double cycle of movement for the X pins as chain 60 travels around the orbit defined for it by the sprockets in FIG. 2. If in a particular installation a smaller velocity differential is desired, that is, if the X and Y pins need not have the pitch provided for in FIG. 6 hex shaft 90 in FIG. 4 can be used to bring the axis of cam track 80 into closer alignment with the axis of shaft 64, and hence of yoke 78, and reduce the 45 degree angle between crank arm 72 and the offset orientation of track 80 along which adjustment screw 90 acts. When the pitch distance between the X and Y pins at the upper run of the X and Y chain orbits is initially set, it will accommodate a predetermined number (6) of articles of predetermined diameter as suggested in FIG. 2. Variation of this pitch distance will permit the machine operator to accommodate different numbers of articles in an article group and/or different article size or shape.

Another feature of the present invention is to provide positive control for both the X and Y pins as they move upwardly through the plane of the infeed conveyor 44 so that these pins move vertically upwardly between the articles as suggested in FIG. 2, and thence move in a true vertical orientation downstream until they are swung out of the way around the head sprocket 96.

Cam means 100/102 is provided for engaging cam rollers 104, 104 provided on the base of both X and Y pins. These rollers are provided in each pin support at a point offset from the attachment point between these pins and their associated chains. Thus, cam track elements 100 and 102 define a space into which this roller 104 will be adapted to move so as to maintain these X and Y pins in a vertical orientation as they travel, initially upwardly so that the upper ends of the pins penetrate the plane of the infeed conveyor 44, and thence horizontally so that these pins move parallel to the downstream direction for the bottles and with the speed variations referred to previously.

FIG. 3 shows the support structure for the sprocket assemblies 96 and the sprocket assemblies 94 are similarly supported and need not be described in detail herein. As shown the headstock sprocket assemblies 96, 96 are rotatably supported on a shaft 106 journalled at its opposite in bearings 108, 108 provided in the fixed frame 10 of the packer. The X chain headstock sprockets 96a, 96a of each of the head stock sprocket assemblies 96 is keyed to this shaft as shown at 110. A flight bar 112 extends across and between the X chains 60, 60 being attached to these chains for movement therewith and supporting the upright pins X, X. More particularly, each flight bar 112 includes inverted channels attached to these chains 60, 60 and an intermediate member 114 connected at opposite ends to the inboard channel flanges as best shown in FIG. 3. The left-hand channel in FIG. 3 carries the cam roller 104 (not shown, but adapted to cooperate with the camming means 100/102 referred to previously).

The inboard sprockets 96b, 96b are rotatably supported on this shaft 106 and connected to one another by a torque tube 116. These sprockets 96b carry chain 62, 62 and are in turn connected to flight bars 118 which are similarly constructed to the X pin flight bars 112 and are connected to the chains 62, 62 as suggested at 120. Note that the flight bars 112 are connected to the chains 60 as suggest at 119 in FIG. 3. The Y pins Y, Y are connected to an intermediate portion 122 of flight bar 118.

Two pins are provided for engagement with each line of articles as defined between the several lane guide means G, G conventionally provided in the machine framework as described in the above-identified co-pending patent application. FIG. 3 also shows the individual infeed conveyors 44, 44 associated with each of the lanes, and these conveyors are provided between the double set of pins indicated at X in FIG. 3, with sufficient space provided between the infeed conveyor 44 and the right hand pin X of each lane so as to provide space for the lugs of the pocket chain conveyor 46 (not shown in FIG. 3) to move therebetween as shown in greater detail in said co-pending patent application. One possible configuration for the overlapping area 50 between the infeed conveyor 44 and the lug conveyor 46 can be seen in said co-pending application at FIG. 11 thereof wherein the infeed conveyor is depicted generally at 40, and the lugs at 82, 82. In the presently preferred embodiment, however, only one such lug conveyor is deemed to be necessary for controlling the grouped articles as they leave the grouper for movement downstream into the infeed station of the packer. The speed of the infeed conveyor 44 is such that articles are continuously presented to the grouper for grouping, and if for any reason there is a deficiency in the supply of such articles or bottles the packer should be shut down or at least slowed down. The speed of the pins moving upwardly through the horizontal plane of the infeed conveyor 44 is such that the horizontal component of pin velocity at this point is closely matched to the speed of the infeed conveyor 44 so as to achieve a smooth slowing down of the article groups for providing the necessary space between the front of each group and the trailing end of the preceding group. The lugs on conveyor 46 move into this space and control the groups of articles as they move downstream to the infeed station. At the point in time when pin $X_0$ penetrates this horizontal plane of infeed conveyor 44 pin $X_0$ is moving at the same speed as that of the infeed conveyor, or at least no faster than such infeed conveyor speed. So too, pin $Y_0$ is also moving at the same speed as indicated in FIG. 7, whereafter $Y_0$ is accelerated so as to move out of the way and pin $X_0$ is decelerated to provide the necessary space between the article groups. At time $t_1$ pin $X_0$ has moved to position $X_1$ and pin $Y_0$ has moved to position $Y_1$. At time $t_2$ pin $X_0$ will have moved to position $X_2$ and pin $Y_0$ will have moved to position $Y_2$ etc. The lug conveyor 46 moves at substantially the same speed as that of the infeed conveyor 44 and all these conveyors are synchronized with one another and with the motion of the ferris wheel which carries the various grid structures into the infeed station for picking up groups of bottles so that they can be drop packed into the continuously moving cases provided below the ferris wheel at the discharge station. As so contructed and arranged the grouper described herein provides superior results for a continuous motion packer of the type described and claimed in said co-pending patent application.

DETAILED DESCRIPTION OF FIGS. 8–11

Turning next to the further embodiment illustrated in FIGS. 8–11 inclusively, and comparing FIG. 9 to FIG. 2 it is noted that the grouper means illustrated schematically in FIG. 9 and identified by reference numeral 160 is in fact generally similar to the grouper of FIG. 2, and that the pins $X_0$ and $Y_0$ correspond to those with the same reference numerals in FIG. 2 and serve to slow up the advancing stream of bottles as they are moved on an underlying lane conveyor 170 which serves much the same purpose as the conveyor 44 described previously with reference to FIG. 2. That is, the lane conveyor 170 is a narrow plate conveyor as shown to best advantage in FIG. 8. As there shown four such lane conveyors 170 are illustrated each of which serves to advance a column of articles from left to right in this view. The $Y_0$ pins actually comprise two pins per lane as shown and described previously with reference to the grouper of FIG. 2 and these sets of pins are illustrated in FIG. 8 also.

Thus, the grouper 160 serves to slow up the advancing articles on the underlying lane conveyors 170, 170 and to provide a separation between the leading edge of this row or column of articles and articles moving downstream on the lane conveyor 170 in order to provide segregated or discrete slugs or groups of articles for packaging purposes at a downstream station in the apparatus (not shown). The lane conveyor 170 like that shown at 44 in FIG. 1 does serve to advance the articles into and through the grouper means so that the grouper can slow the articles slightly and provide a space between the grouper pins and a group of articles as for example the group indicated generally at G in FIG. 9 and also at G in FIG. 8. The speed of lane conveyor 170 is such that the articles slide relative to the conveyor as they are slowed by the grouper pins and then are allowed to accelerate back up to the speed of the underlying lane conveyor 170 at the location shown for them at G in FIGS. 8 and 9.

The present invention relates to the control of the articles as they move away from the lane conveyor 170 and thence downstream to an infeed station of the packer. The packer itself is shown and described in the above-identified U.S. Pat. No. 4,457,121 which has been incorporated by reference herein. Still with reference to FIG. 1 of the first embodiment it is noted that lug conveyor 46 is provided alongside the lane conveyor 44 and more particularly in the space provided between one marginal edge of the lane conveyor 170 and one of the lane guides 180, 180 provided for defining a linear path for the articles themselves as they move through the conveyor apparatus described herein. However, the lug conveyor 190 to be described herein does differ from somewhat from the lug conveyor 46 referred to in the previous embodiment and one difference can be seen from a comparison of FIG. 9 to that of FIG. 1. Where the lug conveyor 46 overlaps the lane conveyor 44 through a substantial portion of the upper run of the grouper pins, it is noted that FIG. 9 illustrates lug conveyor 190 as providing its lugs in the path of movement of the articles only downstream of the upper run for these pins. The overlap is still present as best shown in FIG. 11 wherein the downstream end 172 for the lane conveyor is there shown in overlapped relationship to the path of movement for the lugs on lug conveyor 190. Actually and as noted previously, FIGS. 9 and 11 can be set alongside one another to best illustrate the path of movement for the slugs of articles through the conveyor system described herein.

Still with reference to the differences between the first embodiment and that shown in FIGS. 8–11, lug conveyor 190 overlaps lane conveyor 170 only downstream of the path of movement for the grouper pins. Here again the space between the rather narrow lane conveyors 170, 170 and the lane guides themselves indicated generally 180 provides a space for the lugs 190 to move the articles in orderly columns and in their associated groups by enaging the endmost article in each column or row within the group at a point offset from its center as best shown at the right-hand side of FIG. 8. Where the lug conveyor 46 of the first embodiment continued to so engage the articles as they move into the infeed station of the packer, the present invention deals with the improvement to that geometry wherein the lugs or pushers 190 are shifted laterally as best shown in FIG. 10 from positions in the space between the lane guides 180 and the lane conveyor 170 so that the endmost article in each column is engaged in a centered relationship by its associated pusher or lug 190 in order to better control the group of articles at the infeed station itself (which infeed station is designated generally at I in FIG. 10). It is noted that the pushers 190, 190 of the group or slug located at the infeed station I are in centered relationship with respect to the generally straight line path for the articles as they move through the conveyor system itself. Actually, the articles are supported on fixed fingers 200, 200 at the infeed station itself and the reader is referred to the aboveidentified issued patent for a more complete description of the action for the rotating grid structure which picks up the articles from these fingers and transports them to a load station for the actual packaging operation.

In summary then the lane conveyors 170, 170 advance the articles continually from left to right through the conveyor system described above. Grouper pins $X_0$, $Y_0$ move upwardly between the articles and act to slow predetermined numbers of the articles relative the underlying lane conveyor 170 and thereby provide a separation between said articles and those moving downstream unhibited on the lane conveyors 170, 170. These groups G of articles on the lane conveyor 170 are in turn engaged by pusher lugs 190, 190 so as to be moved downstream off the ends of said lane conveyor 172 by reason of the overlap between the downstream end of said lane conveyor 170 and the upstream portion of the lug conveyor system itself. Once the articles have been advanced by the lug conveyors off the lane conveyors 170 these lugs 190 are shifted by a cam mechanism such that the chain on which the lugs 190 are mounted follows first and inclined path to the center of its associated lane and then assumes a straight configuration such that the lugs 190 are aligned with the major diameter portion of the circular articles or bottles being handled as best shown in FIG. 10. This geometry provides for continuous handling of the articles from below, and leaves the tops of the articles free of any overhead flight bar conveyor system or other impediment to smooth operation of a packaging machine generally. While the present invention is described in terms of a continuous motion packer of the type shown and described in the above-identified U. S. patent, the invention is not so limited but may be adapted for use in a case packer of the intermittently movable type.

We claim:

1. In a conveyor system wherein side-by-side columns of articles are to be grouped for handling in a packer or the like, the combinaton comprising several side-by-side infeed plate conveyors for moving the columns of articles in a downstream direction, lane guides provided between said plate conveyors to maintain the integrity of the article columns, a plurality of side-by-side conveyor chains, projecting pins carried by said chains, variable speed drive means for moving one of said chains at a speed which varies cyclically as the chains follow a closed orbit that includes an upper run oriented so that the pins moved in the same path and in the same direction as the advancing articles, differential means coupling said one chain to another of said chains so that said pins move in the same orbit but it is speed which varies inversely to that of said one chain and pins, said pins provided in staggered relationship to one another in said orbit to provide a predetermined pitched distance between said pins as they move along said upper run, said pitched distance between pins and said conveyor chains varying cyclically between maximum and minimum limits, means for adjusting said differential means to provide a desired spread or difference between said maximum and minimum pin pitch limits, the individual flat plate conveyor means moving the columns of articles toward said upper runs of said conveyor chains where the articles are decelerated to the plate conveyor by the projecting pins, and said flat plate conveyor is also serving to accelerate the groups of articles away from the pins in order to provide a desired spacing therebetween.

2. The conveyor system according to claim 1 further characterized by outfeed lug conveyor means for moving the article groups off said flat plate conveyor means in a closely controlled condition, said lug conveyor means having an upstream portion overlapping a downstream portion of said plate conveyors.

3. The conveyor system according to claim 2 wherein said articles have a width greater than that of said plate lane conveyors to provide a space along at least one side of each lane conveyor and an associated lane guide, and said lug conveyor means upstream portion located in said space.

4. The conveyor system according to claim 3 wherein said lug conveyor means have an offset portion immediately downstream of said upstream portion so that the lugs of said lug conveyor means shift laterally as they move downstream beyond said plate lane conveyor and assume centered positions between said lane guides.

* * * * *